(12) United States Patent
Ishida

(10) Patent No.: US 7,082,976 B2
(45) Date of Patent: Aug. 1, 2006

(54) PNEUMATIC TIRE HAVING TREAD PORTION FORMED OF TWO LAYERS

(75) Inventor: Hirokazu Ishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 218 days.

(21) Appl. No.: 10/315,991

(22) Filed: Dec. 11, 2002

(65) Prior Publication Data
US 2003/0127168 A1    Jul. 10, 2003

(30) Foreign Application Priority Data

Dec. 11, 2001 (JP) ............. 2001-377203
Aug. 27, 2002 (JP) ............. 2002-246713

(51) Int. Cl.
  *B60C 1/00* (2006.01)
  *B60C 11/00* (2006.01)
(52) U.S. Cl. .................................. 152/209.5
(58) Field of Classification Search ......... 152/209.5
See application file for complete search history.

(56) References Cited

U.S. PATENT DOCUMENTS

| | | | |
|---|---|---|---|
| 4,257,468 A | | 3/1981 | Ogawa et al. |
| 4,396,052 A | * | 8/1983 | Ahagon et al. .......... 152/209.5 |
| 4,580,608 A | | 4/1986 | Rampl |
| 4,945,964 A | * | 8/1990 | Takiguchi et al. ....... 152/209.5 |
| 5,088,537 A | * | 2/1992 | Kan et al. .................... 152/525 |
| 5,181,976 A | | 1/1993 | Iwafune et al. |
| 6,035,911 A | | 3/2000 | Matsumoto et al. |
| 6,095,217 A | * | 8/2000 | Nakamura et al. ....... 152/209.5 |

FOREIGN PATENT DOCUMENTS

| | | | |
|---|---|---|---|
| EP | 0 885 754 A1 | | 12/1998 |
| JP | 59-14502 | | 1/1984 |
| JP | 63-112636 | * | 5/1988 |
| JP | 64-30806 A | | 2/1989 |
| JP | 4-85104 | * | 3/1992 |
| JP | 06-016012 A | | 1/1994 |
| JP | 06-191221 A | | 7/1994 |
| JP | 10-35212 A | | 2/1998 |
| JP | 11-278008 | * | 10/1999 |
| JP | 2001-30703 A | | 2/2001 |

* cited by examiner

*Primary Examiner*—Steven D. Maki
(74) *Attorney, Agent, or Firm*—Birch,Stewart,Kolasch, and Birch, LLP

(57) ABSTRACT

A pneumatic tire has a rubber member at least partially constituting a tread portion, which member is formed of at least two layers of an outer layer on a tire surface side and an inner layer on a carcass side. A blended amount (X) of an antioxidant in the outer layer is in a range of 0.4–1.6 weight % of an entire composition, and the blended amount (X) of the antioxidant in the outer layer and a blended amount (Y) of the antioxidant in the inner layer satisfy the expression: $Y \geq -0.4 X^2 + 2X$. Thus, a pneumatic tire suffering less rubber degradation and alleviated in discoloring of the tire surface in prolonged use is provided.

15 Claims, 2 Drawing Sheets

PNEUMATIC TIRE HAVING TREAD PORTION FORMED OF TWO LAYERS

BACKGROUND OF THE INVENTION

1. Field of the Invention

The present invention relates to a rubber composition of a tread portion of a pneumatic tire suffering less rubber degradation and alleviated in discoloring of the tire surface in prolonged use.

2. Description of the Background Art

Rubbers such as natural rubber, styrene-butadiene rubber, polybutadiene rubber and nitrile-butadiene rubber have been used widely as the rubber compositions for tread portions and/or sidewall portions of pneumatic tires. Such rubber compositions for tires suffer considerable deformative flexure over a long run and are exposed to high-temperature conditions and ultraviolet radiation, so that they deteriorate with age and become unusable. This phenomenon is usually called "aging".

Aging of rubber compositions proceeds due to various factors. Among them, external factors include oxygen in the air, oxide, heat, light, ozone, manganese compound, radiation, repetitive deformation during the tire run, and others. Internal factors include kinds of rubber components, conditions on and degrees of vulcanization of rubber, kinds of vulcanizing agents, kinds of vulcanization accelerators, and others. These factors interact with one another to cause the aging of rubber.

Rubber compositions suffer aging primarily due to oxygen and ozone. In the case of aging due to oxygen, hydrocarbon in a rubber molecule generates hydrocarbon radicals and hydrogen radicals in the presence of oxygen under the influence of heat or light. The hydrocarbon radical is reacted with oxygen to generate hydroperoxide, which then is reacted with hydrocarbon in another rubber molecule to further generate hydrocarbon radicals. Such chain reactions cause decomposition of principal chains of the rubber molecules, thereby degrading physical properties thereof.

Diene-based rubbers, such as natural rubber, polyisoprene rubber, polybutadiene rubber and styrene-butadiene rubber, are aged by ozone. Ozone is electrophilically reacted with a double bond of a rubber molecule to cut the double bond portion. This essentially differs from the oxidation described above. The aging due to oxygen or ozone is further promoted by repeated deformative flexure and increased temperature during the tire run.

An antioxidant is conventionally blended in a rubber composition to prevent such aging. With prolonged use of a tire, however, the antioxidant in the rubber composition is consumed as reacted with ozone, heat, ultraviolet radiation and others, and the anti-aging effect gradually decreases. Although the antioxidant of an amount greater than required may be blended in advance, it would discolor the surface of the rubber composition and worsen the appearance.

The rubber composition increasingly hardens with advance of aging. One way to keep the hardness constant is to add oil in the rubber composition. Generally, oil tends to migrate inside the rubber composition, and thus, a method for preventing such migration to maintain uniform hardness over a long period of time has been proposed. For example, in Japanese Patent Laying-Open No. 64-30806, an oil barrier is provided between a tread and a belt of a studless tire. At least 30 weight % of polymer blended in the barrier is formed with halogenated butyl rubber. This method, however, does not alleviate degradation by oxygen or ozone itself. Thus, it cannot suppress degradation of basic properties of the rubber composition, i.e., tensile strength or elongation, grip performance in the tread portion, and others.

In some examples, a re-crosslink inhibitor is blended in a tread portion of a pneumatic tire to restrict changes in physical properties. For example, Japanese Patent Laying-Open No. 2001-30703 discloses a rubber composition including water-soluble fiber and at least one kind of re-crosslink inhibitor selected from dithioic phosphoric acid, thiuram vulcanization accelerator and a compound of 4-methyl benzo thiazole group. Such blending of the re-crosslink inhibitor alone, however, would merely restrict hardening by preventing changes in cross-linked state. It cannot achieve a barrier effect against the influence of external environment.

In other examples, an inorganic filler is blended in the tread portion to improve initial performance. For example, in U.S. Pat. No. 6,035,911, a fluorine-based additive is added to a surface layer of the tread portion of the tire. Although the initial performance may be improved with this method, it cannot prevent performance degradation.

SUMMARY OF THE INVENTION

The present invention has been made to solve the above-described problems of the prior art, and is directed to a pneumatic tire with which rubber degradation is suppressed and discoloring of a tire surface is alleviated over a long-time use thereof, and is further directed to a rubber composition of a tread portion of a pneumatic tire with which degradation of grip performance is restricted in prolonged use thereof.

The present invention resides in a pneumatic tire wherein a rubber member at least partially constituting a tread portion is formed of at least two layers of an outer layer on a tire surface side and an inner layer on a carcass side. The outer layer has an antioxidant blended therein in an amount (X) in a range of 0.4–1.6 weight % of the entire composition, and the blended amount (X) of the antioxidant in the outer layer and a blended amount (Y) of the antioxidant in the inner layer satisfy the following expression (1).

$$Y \geq -0.4\,X^2 + 2X \qquad (1)$$

Here, it is preferable that the antioxidant satisfying the above expression (1) is blended in an amount in a range of 0.6–2.1 weight % in the rubber composition including at least one kind of rubber component.

Preferably, the outer layer and the inner layer include substantially the same rubber components, and the same kind of antioxidant is blended in the outer layer and the inner layer. Further, a ratio (Vo/Vi) of a volume (Vo) of the outer layer to a volume (Vi) of the inner layer is preferably in a range from 2/8 to 8/2.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Configuration of Pneumatic Tire

In the present invention, a rubber member at least partially constituting a tread portion of a pneumatic tire is formed of an outer layer on a tire surface side and an inner layer on a carcass side. Here, the phrase "at least partially constituting" is meant by that the rubber member constitutes at least the tread portion of the pneumatic tire, or a portion of the tread portion.

Figure 2:
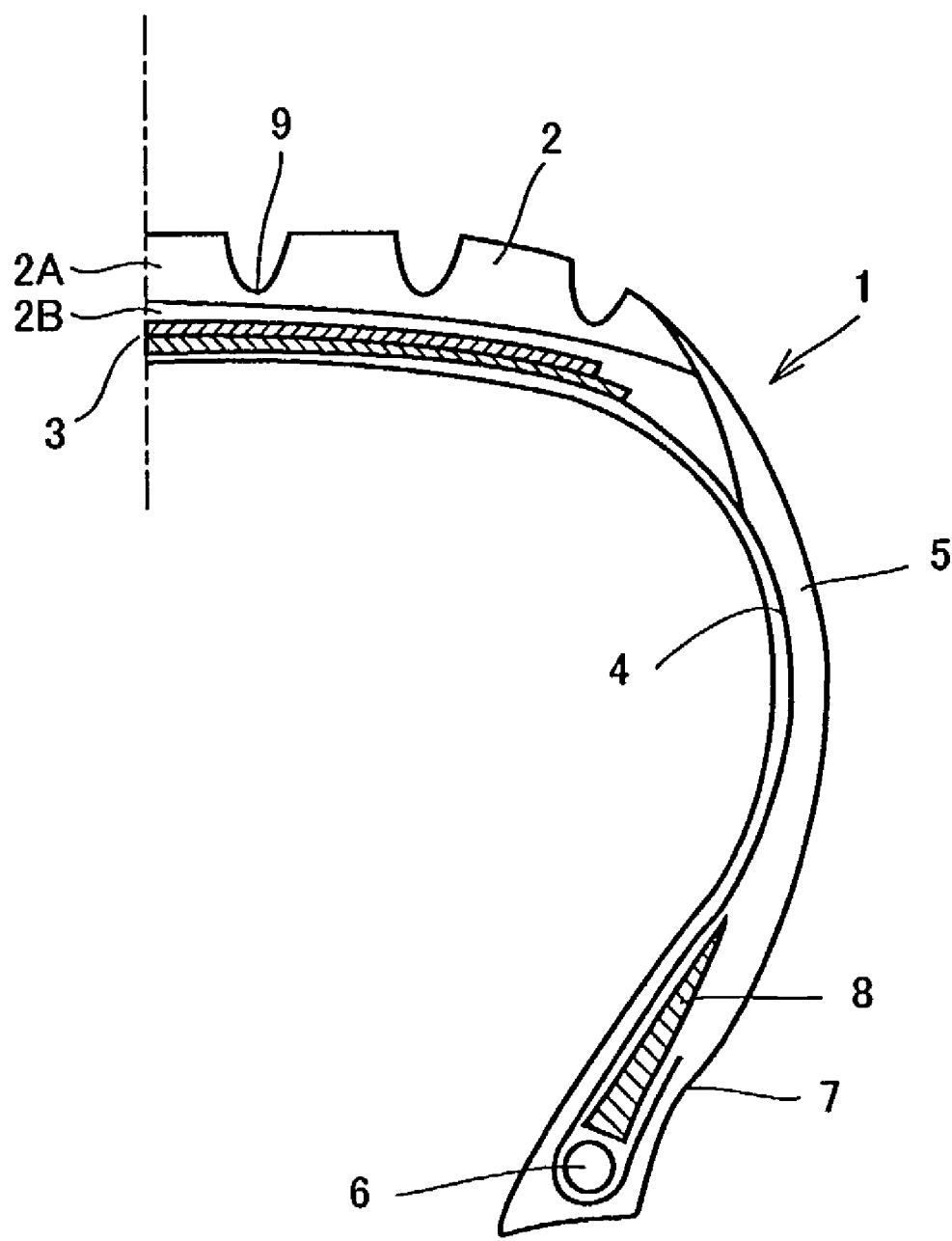
FIG. 2 is a cross sectional view of a right half of the pneumatic tire.

Hereinafter, the present invention is described specifically. A right half of a pneumatic tire is shown in cross section in FIG. 2. Referring to FIG. 2, the pneumatic tire 1 includes a carcass 4 having its end folded around and engaged with a bead core 6, a belt layer 3 formed of two reinforcement layers arranged in a tire crown portion radially outwardly of carcass 4, a tread portion 2 arranged further outwardly of belt layer 3, a sidewall portion 5 extending from an end of tread portion 2 toward a bead portion 7, and a bead apex 8 of hard rubber extending from an upper side of bead core 6 toward sidewall portion 5.

Tread portion 2 is divided into an outer layer 2A on the ground-contact side and an inner layer 2B on the carcass side. Outer layer 2A directly contacting the road surface suffers intense repetitive deformation and also directly receives irradiation of light, and thus, it suffers particularly serious degradation. As a result, a crack will occur at a bottom 9 of the tread groove which is likely to suffer repetitive stress strain during a run. On the other hand, sidewall portion 5 extending from the end portion of the tread receives irradiation of light, although it does not directly contact the road surface. Thus, properties required for the tread portion and for the sidewall portion are basically different from each other. For example, high grip performance is required for the tread portion as it directly contacts the road surface.

Based on the foregoing, the present invention is characterized in that the blended amount (X) of antioxidant in the outer layer 2A of the tread portion is set in a rage of 0.4–1.6 weight % of the entire rubber composition, and the blended amount of the antioxidant satisfies the expression (1) below. If the blended amount of the antioxidant is less than 0.4 weight %, the anti-aging effect will be insufficient, leading to occurrence of a crack. If the blended amount of the antioxidant exceeds 1.6 weight %, the appearance of the tread surface will worsen. More preferably, the blended amount of the antioxidant in the outer layer is set to a range of 0.6–1.3 weight %.

With the blended amounts of the antioxidant in the inner layer and in the outer layer satisfying the expression $$Y \geq -0.4 X^2 + 2X \quad (1),$$

the antioxidant comes to migrate gradually from the inner layer to the outer layer over a long-time use of the tire, so that the anti-aging effect can be maintained. In addition, resistivity against the influences of compression, elongation and friction during the run as well as internal heat generation can be ensured over a long period of time, so that initial grip performance is maintained.

Figure 1:
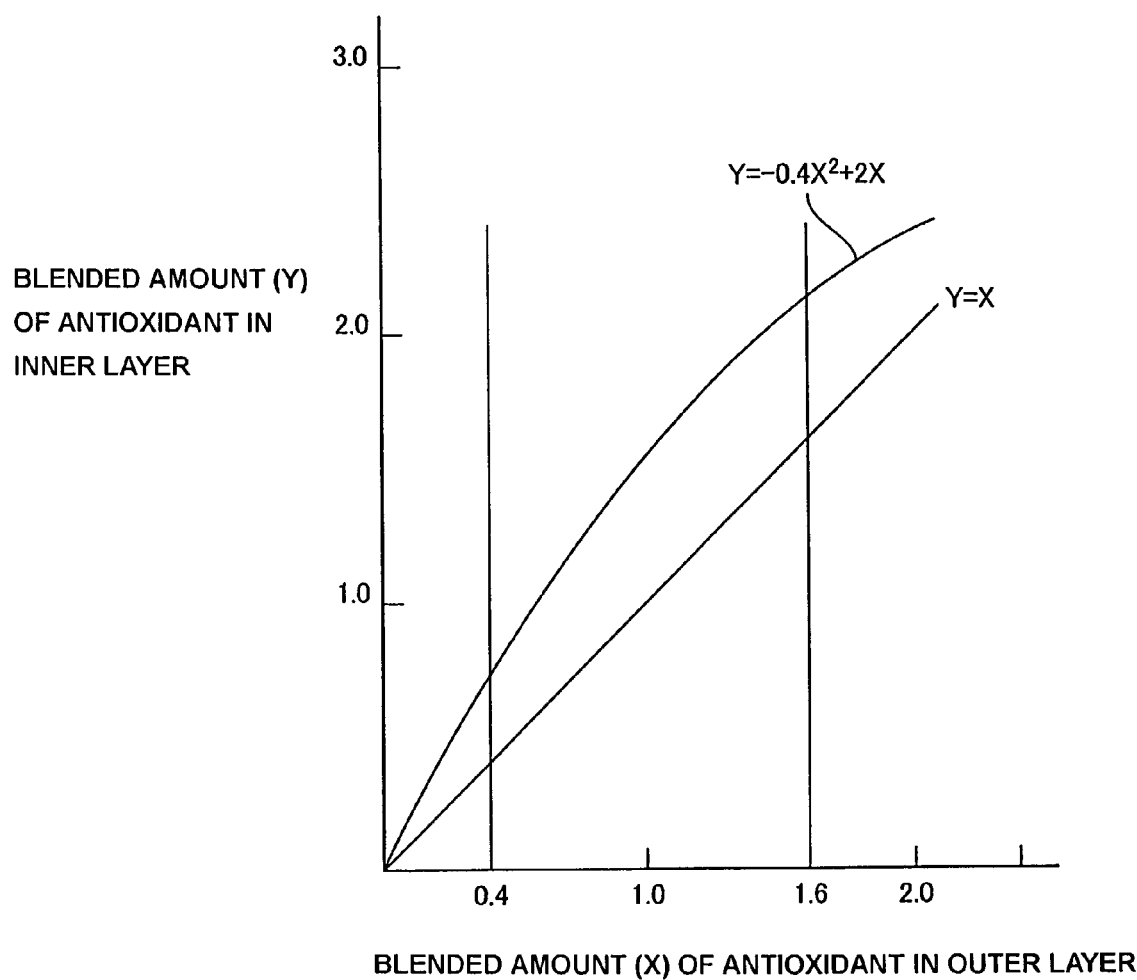
FIG. 1 illustrates relation between blended amounts of antioxidant in outer and inner layers of a tread portion of the pneumatic tire.

The relation indicated by the above expression (1) is illustrated in FIG. 1. It is preferred that the blended amounts of the antioxidant in the outer and inner layers are adjusted in a region in FIG. 1 defined by the expression (1). If $Y < -0.4 X^2 + 2X$, the effect of the antioxidant will not be expected over a long period of time. If Y is simply larger than X, i.e., Y>X, desired performance of the tread rubber, especially the initial grip performance, cannot be maintained over a long period of time.

Here, the blended amount (Y) of the antioxidant in the inner layer is set not to exceed 2.5 weight % of the entire composition, and more preferably not greater than 2.1 weight %. If the blended amount of the antioxidant is too much, appearance will worsen over a long run, and adhesiveness with the carcass layer and the belt layer adjacent to the inner layer will be degraded undesirably.

Further, if the outer layer and the inner layer have rubber compositions extremely different from each other, they will exhibit different solubility against the antioxidant, which will adversely affect the speed of migration. Accordingly, the outer layer and the inner layer are formed of substantially the same rubber composition including substantially the same kinds of rubber components blended in substantially the same ratio. Here, "substantially the same" rubber composition mean that, in the case of a rubber composition supposed to have one kind of rubber component included therein, it may additionally include another kind of rubber component of not greater than 25 weight %. In the case of a rubber composition having two or more kinds of rubber components included therein, it means that a difference between the blended ratio of the rubber components in the rubber composition used for the outer layer and that in the rubber composition used for the inner layer is not greater than 25%.

Further, the same antioxidant is preferably blended in the outer layer and the inner layer, because different kinds of antioxidants may have different migration speeds in rubber compositions.

Next, the ratio (Vo/Vi) of the volume (Vo) of the outer layer to the volume (Vi) of the inner layer is preferably in a range from 2/8 to 8/2, and more preferably in a range from 3/7 to 7/3. If the volume ratio is less than 2/8, the outer layer will become too thin. In such a case, initial anti-aging property (anti-crack property) is inferior and grip performance is considerably degraded over age. On the other hand, if the volume ratio exceeds 8/2, the migration effect of antioxidant from the inner layer is small, so that long-term anti-aging property (anti-crack property) and grip performance are both degraded. If the blended amount of antioxidant in the outer layer is increased to improve initial anti-aging property (anti-crack property) when the volume ratio is, e.g., 1/9 or 9/1, the appearance will worsen.

Of the rubber member of the tread portion, the outer layer has grooves formed therein, so that the outer layer is inevitably thin at the bottom of each groove. It is preferable that the outer layer has a thickness of at least 0.5 mm at the groove bottom, to prevent the inner layer from being exposed at the groove bottom.

Specific Examples of Antioxidant

The antioxidant used in the present invention is effective in preventing aging attributable to the action of oxygen or ozone and deformative flexure, and is capable of preventing degradation in grip performance of the tread portion, so that it is interpreted in the broadest context. Specific examples of the antioxidant include: aldol-α-naphthylamine, phenyl-β-naphthylamine, phenyl-α-naphthylamine, octylized diphenylamine, acetone diphenylamine-reactant, 1,2-dihydro-2,2,4-trimethylquinoline, 6-ethoxy-1,2-dihydro-2,2,4-trimethylquinoline, N,N-diphenyl-p-phenylenediamine, N,N-di-β-naphtyl-p-phenylenediamine, phenyl cyclohexyl-p-phenylenediamine, phenyl-isopropyl-p-phenylenediamine, N-phenyl-N'-(1-methylhepthyl)-p-phenylenediamine, N-phenyl-N'-(1,3-dimethylbutyl)-p-phenylenediamine, N-N'-di-(1,4-dimethylbenthyl)-p-phenyldiamine, diallyl-p-phenylenediamine, styrenized phenol, 2,6-di-t-butyl-p-cresol, 2,5-di-t-butylhydroquinone, 2,5-di-t-amylhydroquinone, 2,2'-methylene-bis-(4-methyl-6-t-butylphenol), 2,2'-methylene-bis-(4-ethyl-6-t-butylphenol), 4,4'-thio-bis-(6-t-butyl-m-cresol), 4,4'-butyl-bis-(6-t-butyl-m-cresol), thiourea derivative, nickel salt of dibutyl dithiocarbamic acid, 2-mercapto-benzimidazole, and alkylated allyl phosphite.

Rubber Component

As the rubber component for use in the tread portion of the pneumatic tire of the present invention, one or more kinds of natural rubber (NR) and synthetic rubber are employed. Examples of the synthetic rubber include: polyisoprene rubber (IR), polybutadiene rubber (BR), polychloroprene rubber (CR), styrene-butadiene rubber (SBR), isoprene-isobutylene rubber (IIR), ethylene-propylene-diene rubber (IPDM), modified rubbers thereof, and blends thereof. These rubber components are suitably adjusted corresponding to the physical properties required for the rubber member, i.e., the tread portion of the tire. Natural rubber, styrene-butadiene rubber and polybutadiene rubber are suitably used for the tread portion. It is preferred that the antioxidant satisfying the above expression (1) is blended in the rubber composition including at least one of such rubber components in an amount in a range of 0.4–2.5 weight %, and more preferably in a range of 0.6–2.1 weight %. If it is less than 0.4 weight %, the crack cannot be prevented by the anti-aging effect, or grip performance cannot be maintained. If it exceeds 2.5 weight %, the appearance will worsen.

Other Ingredients

In the rubber composition of the tread portion of the pneumatic tire of the present invention, carbon black is blended 10–200 parts by weight with respect to 100 parts by weight of the rubber component. Here, SAF, ISAF, ISAF-LS, ISAF-HS, HAF, HAF-LS, HAF-HS, FEF, GPF, CF and others may be used as the carbon black.

Alternatively, white carbon instead of or in addition to the black carbon may be blended in the rubber composition. The white carbon in various product grades, such as Carplex, Nipsil, Tokusil or Silnex, may be employed. The white carbon is blended normally in an amount of not greater than 50 parts by weight with respect to 100 parts by weight of the rubber component.

Further, common ingredients including plasticizer, stabilizer, ultraviolet absorber, anti-static agent, crosslinking agent and vulcanization accelerator, may be selectively blended in a prescribed amount, according to the properties required for the rubber member of the tread portion of the pneumatic tire.

EXAMPLES

Examples 1–10, Comparative Examples 1–6

Passenger car tires (TL195/65R15 91H) each with a basic structure as shown in FIG. 2 and having a tread portion formed of two layers were manufactured by way of trial. The ingredients in the outer layers and the inner layers of the tread portion are shown in Table 1 and Table 2, respectively, wherein the blended amounts are indicated by parts by weight.

TABLE 1

| No. | Ingredients in Outer Layers | | | | | | | | | |
|---|---|---|---|---|---|---|---|---|---|---|
| | OUT 1 | OUT 2 | OUT 3 | OUT 4 | OUT 5 | OUT 6 | OUT 7 | OUT 8 | OUT 9 | OUT 10 |
| Natural Rubber | 0 | 0 | 25 | 30 | 50 | 0 | 0 | 0 | 0 | 0 |
| SBR 1502 | 50 | 50 | 50 | 70 | 0 | 50 | 50 | 50 | 50 | 50 |
| SBR 1712 | 69 | 34 | 0 | 0 | 0 | 69 | 69 | 69 | 69 | 69 |
| BR 1220 | 0 | 25 | 25 | 0 | 50 | 0 | 0 | 0 | 0 | 0 |
| Carbon Black N339 | 85 | 85 | 85 | 50 | 45 | 85 | 85 | 85 | 85 | 85 |
| Zinc Oxide | 3 | 3 | 3 | 3 | 3 | 3 | 3 | 3 | 3 | 3 |
| Stearic Acid | 2 | 2 | 2 | 2 | 2 | 2 | 2 | 2 | 2 | 2 |
| Wax | 2 | 2 | 2 | 2 | 2 | 2 | 2 | 2 | 2 | 2 |
| Aromatic Oil | 16 | 16 | 16 | 16 | 16 | 16 | 16 | 16 | 16 | 16 |
| Antioxidant 6C | 1.5 | 1.5 | 1.5 | 1.5 | 1.5 | 0.7 | 1 | 3 | 3.5 | 4 |
| Sulfur | 1.8 | 1.8 | 1.8 | 1.8 | 2 | 1.8 | 1.8 | 1.8 | 1.8 | 1.8 |
| Accelerator CZ | 1.5 | 1.5 | 1.5 | 1.5 | 0.8 | 1.5 | 1.5 | 1.5 | 1.5 | 1.5 |
| Total (PHR) | 231.8 | 221.8 | 212.8 | 177.8 | 162.3 | 231 | 231.3 | 233.3 | 233.8 | 234.3 |
| Antioxidant 6C (wt %) | 0.65 | 0.68 | 0.70 | 0.84 | 0.92 | 0.30 | 0.43 | 1.29 | 1.50 | 1.71 |

TABLE 2

| No. | Ingredients in Inner Layers | | | | | | | | |
|---|---|---|---|---|---|---|---|---|---|
| | IN 1 | IN 2 | IN 3 | IN 4 | IN 5 | IN 6 | IN 7 | IN 8 | IN 9 |
| Natural Rubber | 0 | 30 | 50 | 0 | 0 | 0 | 0 | 0 | 0 |
| SBR 1502 | 50 | 70 | 0 | 50 | 50 | 50 | 50 | 50 | 50 |
| SBR 1712 | 69 | 0 | 0 | 69 | 69 | 69 | 69 | 69 | 69 |
| BR 1220 | 0 | 0 | 50 | 0 | 0 | 0 | 0 | 0 | 0 |
| Carbon Black N339 | 85 | 50 | 45 | 85 | 85 | 85 | 85 | 85 | 85 |
| Zinc Oxide | 3 | 3 | 3 | 3 | 3 | 3 | 3 | 3 | 3 |
| Stearic Acid | 2 | 2 | 2 | 2 | 2 | 2 | 2 | 2 | 2 |
| Wax | 2 | 2 | 2 | 2 | 2 | 2 | 2 | 2 | 2 |
| Aromatic Oil | 16 | 16 | 6 | 16 | 16 | 16 | 16 | 16 | 16 |
| Antioxidant 6C | 3.5 | 3.5 | 3 | 1 | 1.5 | 2.5 | 4.5 | 5 | 5.5 |
| Sulfur | 1.8 | 1.8 | 2 | 1.8 | 1.8 | 1.8 | 1.8 | 1.8 | 1.8 |
| Accelerator CZ | 1.5 | 1.5 | 0.8 | 1.5 | 1.5 | 1.5 | 1.5 | 1.5 | 1.5 |
| Total (PHR) | 233.8 | 179.8 | 163.8 | 231.3 | 231.8 | 232.8 | 234.8 | 235.3 | 235.8 |
| Antioxidant 6C (wt %) | 1.50 | 1.95 | 1.83 | 0.43 | 0.65 | 1.07 | 1.92 | 2.12 | 2.33 |

Ingredients shown in Tables 1 and 2 are as follows.
SBR 1502: Nipol 1502 manufactured by Zeon Corporation
SBR 1712: Sumitomo-SBR 1712 manufactured by Sumitomo Chemical Co., Ltd.
BR 1220: Nipol BR 1220 manufactured by Zeon Corporation
Antioxidant 6C: Antigene 6C manufactured by Sumitomo Chemical Co., Ltd.
Accelerator CZ: Nocceler CZ manufactured by Ouchishinko Chemical Industrial Co., Ltd.

The tires manufactured by trial were evaluated as follows.

Anti-Crack Property

After a tire run in the ozone atmosphere, a state of crack occurrence at the bottom of the tread groove was evaluated on the scale of 1 to 5. The testing conditions were as follows.
Tire rim: 6J×15
Tire inner pressure: 190 KPa
Tire load: 7130 N
Running speed: 80 km/H
Ozone concentration: 100 pphm
Ozone flow rate: 500 L/H The evaluation result of anti-crack property obtained by testing the tire immediately after manufacture is shown as "initial". The evaluation result obtained by testing the tire after keeping it in a warehouse for six months is shown as "aged". In this performance evaluation, 5 points show a state where there is no crack. 4 points show a state where there are minute cracks. 3 points show a state where there are a small number of small cracks. 2 points show a state where the size and number of cracks are moderate. 1 point shows a state where there are a large number of large cracks. Table 3 shows the evaluation results of Examples, and Table 4 shows the evaluation results of Comparative Examples. In Tables 3 and 4, a volume ratio Vo/Vi is 5/5.

Evaluation of Appearance

Each tire was exposed to the outdoors, and the degree of discoloring of its tire surface was evaluated on the scale of 1 to 5. 5 points indicate the least degree of discoloring. 1 point indicates the greatest degree of discoloring.

Evaluation of Grip Performance

The tires manufactured in compositions as shown in Tables 3 and 4 as Examples and Comparative Examples, respectively, were kept in a warehouse for one year, and then mounted to cars and subjected to brake tests. The results are shown in the corresponding tables. The WET brake performance with a velocity of 100 km/h was evaluated. Each result is shown as an index representing the brake performance of the tire a year after manufacture, with its performance immediately after manufacture set to 100 as a reference value. The smaller numerical values indicate the more worsened grip performance.

Complex Modulus of Elasticity E* (After Run)

Tires were fabricated in compositions shown in Tables 3 and 4 as Examples and Comparative Examples, respectively, and mounted to cars. After a run of 70,000 km, tread rubber of 40 mm×40 mm×0.5 mm was taken from the respective tire and the complex modulus of elasticity E* (MPa) was measured. Here, the complex modulus of elasticity E* is expressed as E*=E'+iE", where E' represents a dynamic modulus of elasticity and E" represents a loss modulus of elasticity. Numerical values shown in Tables 3 and 4 are indices that each represent a rate of change (%) in modulus E* of the respective tire in a year after manufacture, with respect to the modulus E* immediately after manufacture thereof. The conditions on measurement were as follows.
Tested frequency: 10 Hz
Amplitude: 2%
Temperature: 60° C.

TABLE 3

|  | Ex. 1 | Ex. 2 | Ex. 3 | Ex. 4 | Ex. 5 |
|---|---|---|---|---|---|
| Outer layer/Antioxidant (wt %) | OUT 1/0.65 | OUT 2/0.68 | OUT 3/0.70 | OUT 4/0.84 | OUT 5/0.92 |
| Inner layer/Antioxidant (wt %) | IN 1/1.50 | IN 1/1.50 | IN 1/1.50 | IN 2/1.95 | IN 3/1.83 |
| Anti-crack Property (Initial) | 4 | 4 | 4 | 4 | 4 |
| Anti-crack Property (Aged) | 5 | 5 | 5 | 5 | 5 |
| Evaluation of Appearance | 4 | 4 | 4 | 4 | 4 |
| Evaluation of Grip Performance | 97 | 97 | 96 | 97 | 97 |
| Rate of Change in E* (%) | 106 | 131 | 129 | 117 | 118 |

|  | Ex. 6 | Ex. 7 | Ex. 8 | Ex. 9 | Ex. 10 |
|---|---|---|---|---|---|
| Outer layer/Antioxidant (wt %) | OUT 7/0.43 | OUT 1/0.65 | OUT 8/1.29 | OUT 9/1.50 | OUT 7/0.43 |
| Inner layer/Antioxidant (wt %) | IN 1/1.50 | IN 7/1.92 | IN 7/1.92 | IN 8/2.12 | IN 9/2.33 |
| Anti-crack Property (Initial) | 3 | 5 | 5 | 5 | 3 |
| Anti-crack Property (Aged) | 5 | 5 | 5 | 5 | 5 |
| Evaluation of Appearance | 5 | 5 | 4 | 3 | 2 |
| Evaluation of Grip Performance | 96 | 99 | 99 | 99 | 97 |
| Rate of Change in E* (%) | 139 | 121 | 113 | 111 | 118 |

Examples 1 and 4–9 each show the case where the outer layer and the inner layer have the same rubber ingredients, and the blended amount of antioxidant in the outer layer is less than that in the inner layer. Example 2 shows the case where the outer layer is blended with SBR/BR and the inner layer is blended with SBR, and the blended amounts of antioxidant in the outer layer and the inner layer satisfy the above expression (1). Example 3 shows the case where the outer layer is blended with NR/SBR/BR and the inner layer is blended with SBR, and the blended amount of antioxidant in the outer layer is less than that in the inner layer. Examples 1–9 are superior both in anti-crack property and appearance. Example 10 is slightly inferior in appearance, since the blended amount of antioxidant in the inner layer exceeds 2.3 weight %. In Examples 1 and 6–9, grip performance has barely changed in a year, and each exhibit favorable complex modulus of elasticity E*.

property, since the blended amount of antioxidant in the outer layer is less than 0.4 weight %. Comparative Examples 1–3 are hardened, with high dynamic modulus of elasticity E', so that grip performance is degraded. Comparative Example 4, while exhibiting good anti-crack property, is considerably inferior in appearance, since the blended amount of antioxidant in the outer layer exceeds 1.6 weight %. Comparative Examples 5 and 6 each show the case out of the range of the above expression (1), i.e., the case within the range of Y>X and Y<−0.4 $X^2$+2X. Comparative Examples 5 and 6 are inferior in aged anti-crack property, since the migration speed from the inner layer to the outer layer is insufficient. In Comparative Example 5, again, grip performance is degraded with high complex modulus of elasticity E*.

TABLE 4

|  | Comparative Ex. 1 | Comparative Ex. 2 | Comparative Ex. 3 | Comparative Ex. 4 | Comparative Ex. 5 | Comparative Ex. 6 |
|---|---|---|---|---|---|---|
| Outer layer/Antioxidant (wt %) | OUT 1/0.65 | OUT 6/0.30 | OUT 6/0.30 | OUT 10/1.71 | OUT 8/1.29 | OUT 9/1.50 |
| Inner layer/Antioxidant (wt %) | IN 5/0.65 | IN 1/1.50 | IN 7/1.92 | IN 9/2.33 | IN 1/1.50 | IN 7/1.92 |
| Anti-crack Property (Initial) | 3 | 1 | 2 | 5 | 4 | 5 |
| Anti-crack Property (Aged) | 2 | 2 | 3 | 5 | 3 | 3 |
| Evaluation of Appearance | 4 | 4 | 4 | 1 | 4 | 2 |
| Grip Performance | 83 | 88 | 89 | 99 | 92 | 94 |
| Rate of Change in E* (%) | 174 | 170 | 166 | 110 | 162 | 156 |

Comparative Example 1 does not show improvement in anti-crack property, since the blended amounts of antioxidant in the outer layer and the inner layer are the same. Comparative Examples 2 and 3 are inferior in anti-crack Examples 11–17 (Influence of Volume Ratio)

Anti-crack performance and appearance were evaluated in the same manner as described above, while changing the ratio between the volume (Vo) of the outer layer and the volume (Vi) of the inner layer in the tread portion. Table 5 shows the results.

TABLE 5

|  | Ex. 11 | Ex. 12 | Ex. 13 | Ex. 14 | Ex. 15 | Ex. 16 | Ex. 17 |
| --- | --- | --- | --- | --- | --- | --- | --- |
| Outer layer/ | OUT 1/ | OUT 1/ | OUT 1/ | OUT 1/ | OUT 1/ | OUT 1/ | OUT 1/ |
| Antioxidant (wt %) | 0.65 | 0.65 | 0.65 | 0.65 | 0.65 | 0.65 | 0.65 |
| Inner layer/ | IN 7/ | IN 7/ | IN 7/ | IN 7/ | IN 7/ | IN 7/ | IN 7/ |
| Antioxidant (wt %) | 1.92 | 1.92 | 1.92 | 1.92 | L92 | 1.92 | 1.92 |
| Volume Ratio (Vo/Vi) | 1/9 | 2/8 | 3/7 | 5/5 | 7/3 | 8/2 | 9/1 |
| Anti-crack Property (Initial) | 2 | 4 | 5 | 5 | 5 | 4 | 2 |
| Anti-crack Property (Aged) | 4 | 5 | 5 | 5 | 5 | 4 | 2 |
| Evaluation of Appearance | 3 | 4 | 5 | 5 | 5 | 5 | 5 |

From Table 5, it is found that the anti-crack property and the appearance are most superior when the ratio (Vo/Vi) between the volume (Vo) of the outer layer and the volume (Vi) of the inner layer is in the range from 3/7 to 7/3.

As described above, the pneumatic tire of the present invention has at least a tread portion formed of an outer layer and an inner layer, and the blended amounts of antioxidant in the outer and inner layers satisfy the expression (1) $Y \geq -0.4 X^2 + 2X$. Thus, satisfactory anti-crack property and appearance are achieved at the same time. It also exhibits favorable grip performance and complex modulus of elasticity E* required for the tread portion, and hardly changes over age. Accordingly, a tread portion of a tire exhibiting high performance is obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pneumatic tire having a rubber member at least partially constituting a tread portion, the rubber member being formed of at least two layers of an outer layer on a tire surface side and an inner layer on a carcass side,
   wherein a blended amount (X) of an antioxidant in the outer layer is present in a range of 0.4–1.6 weight % of the entire composition of the outer layer, and the blended amount (X) of the antioxidant in the outer layer and a blended amount (Y) of the antioxidant in the inner layer satisfy the following expression (1):

$$Y \geq -0.4 X^2 + 2X \tag{1}$$

and further wherein,
   the inner layer contains antioxidant blended throughout the inner layer; and
   substantially the entire surface area of the inner surface of the outer layer is in contact with the inner layer.

2. The pneumatic tire according to claim 1, wherein in said tread portion, the blended amount (Y) of the antioxidant in the inner layer is in a range of 0.4–2.5 weight % of a rubber composition including at least one kind of rubber component.

3. The pneumatic tire according to claim 2, wherein the blended amount (Y) of the antioxidant is in a range of 0.4–2.1 weight %.

4. The pneumatic tire according to claim 1, wherein the outer layer and the inner layer include substantially the same rubber components.

5. The pneumatic tire according to claim 1, wherein the same kind of antioxidant is blended in the outer layer and the inner layer.

6. The pneumatic tire according to claim 1, wherein a ratio (Vo/Vi) of a volume (Vo) of the outer layer to a volume (Vi) of the inner layer is in a range from 2/8 to 8/2.

7. The pneumatic tire according to claim 1, wherein in said tread portion, the blended amount (Y) of the antioxidant in the inner layer is in a range of 0.4–2.5 weight % of the entire rubber composition of the inner layer.

8. The pneumatic tire according to claim 1, wherein a ratio (Vo/Vi) of a volume (Vo) of the outer layer to a volume (Vi) of the inner layer is in a range from 3/7 to 7/3.

9. A pneumatic tire having a tread portion and a sidewall portion, said tread portion comprising a rubber outer layer forming a tread surface and a rubber inner layer disposed under and adjacent to the outer layer, wherein said outer layer contains a blended amount (X) of an antioxidant in a range of 0.4–1.6 weight % based on the entire outer layer rubber composition, and wherein the inner layer contains a blended amount (Y) of an antioxidant which is present in an amount based on the entire inner layer rubber composition that satisfies the following expression (1):

$$Y \geq -0.4 X^2 + 2X \tag{1}$$

and further wherein,
the inner layer contains antioxidant blended throughout the inner layer; and
substantially the entire surface area of the inner surface of the outer layer is in contact with the inner layer.

10. The pneumatic tire according to claim 9, wherein the blended amount (Y) of the antioxidant is in the range of 0.4–2.5 weight % based on the entire inner layer rubber composition.

11. The pneumatic tire according to claim 10, wherein the blended amount (Y) of the antioxidant is in a range of 0.4–2.1 weight %.

12. The pneumatic tire according to claim 9, wherein the outer layer and the inner layer include substantially the same rubber components.

13. The pneumatic tire according to claim 9, wherein the same kind of antioxidant is blended in the outer layer and the inner layer.

14. The pneumatic tire according to claim 9, wherein a ratio (Vo/Vi) of a volume (Vo) of the outer layer to a volume (Vi) of the inner layer is in a range from 2/8 to 8/2.

15. The pneumatic tire according to claim 9, wherein a ratio (Vo/Vi) of a volume (Vo) of the outer layer to a volume (Vi) of the inner layer is in a range from 3/7 to 7/3.

* * * * *